(12) United States Patent
Mishra et al.

(10) Patent No.: US 11,645,561 B2
(45) Date of Patent: May 9, 2023

(54) QUESTION ANSWERING SYSTEM INFLUENCED BY USER BEHAVIOR AND TEXT METADATA GENERATION

(71) Applicant: International Business Machines Corporation, Armonk, NY (US)

(72) Inventors: Abhijit Mishra, Bangalore (IN); Enara C Vijil, Westchester, NY (US); Seema Nagar, Bangalore (IN); Kuntal Dey, Vasant Kunj (IN)

(73) Assignee: International Business Machines Corporation, Armonk, NY (US)

( * ) Notice: Subject to any disclaimer, the term of this patent is extended or adjusted under 35 U.S.C. 154(b) by 1087 days.

(21) Appl. No.: 16/356,315

(22) Filed: Mar. 18, 2019

(65) Prior Publication Data
US 2020/0302316 A1    Sep. 24, 2020

(51) Int. Cl.
| | |
|---|---|
| *G06F 16/31* | (2019.01) |
| *G06N 5/043* | (2023.01) |
| *G06N 3/049* | (2023.01) |
| *G06F 17/18* | (2006.01) |
| *G06F 16/383* | (2019.01) |
| *G06F 3/01* | (2006.01) |
| *G06F 16/332* | (2019.01) |

(52) U.S. Cl.
CPC ............ *G06N 5/043* (2013.01); *G06F 3/013* (2013.01); *G06F 16/313* (2019.01); *G06F 16/3329* (2019.01); *G06F 16/383* (2019.01); *G06F 17/18* (2013.01); *G06N 3/049* (2013.01)

(58) Field of Classification Search
CPC .................................................... G06F 16/313
See application file for complete search history.

(56) References Cited

U.S. PATENT DOCUMENTS

| | | | |
|---|---|---|---|
| 9,286,711 B2 | 3/2016 | Geisner et al. | |
| 2015/0049113 A1* | 2/2015 | Rahman | G02B 27/017 345/633 |
| 2015/0213634 A1* | 7/2015 | Karmarkar | A61B 5/163 345/589 |
| 2016/0055146 A1* | 2/2016 | Hayase | G06F 40/169 704/9 |

(Continued)

OTHER PUBLICATIONS

Anonymous; "Improving User Feedback In A Question Answering System For Indirect Answers"; IP.com No. IPCOM000239021D; Oct. 1, 2014; 4 pages.

(Continued)

*Primary Examiner* — Mohammad S Rostami
(74) *Attorney, Agent, or Firm* — Cantor Colburn LLP; Stosch Sabo

(57) ABSTRACT

Provided are systems, methods, and media for handling dialogs based on user behavior data. An example method includes receiving an input paragraph having one or more factual sentences, in which each of the one or more factual sentences includes one or more words. Receiving an input question comprising one or more words. Performing word-level gaze prediction on the input paragraph to identify one or more predicted gaze attributes for the input paragraph. Extracting an answer to the input question based, at least in part, on the input paragraph, the input question, and the one or more predicted gaze attributes of the input paragraph. Transmitting the extracted answer.

14 Claims, 6 Drawing Sheets

(56) References Cited

U.S. PATENT DOCUMENTS

| | | | |
|---|---|---|---|
| 2017/0039869 A1 | 2/2017 | Gleim et al. | |
| 2018/0011533 A9 | 1/2018 | Marggraff et al. | |
| 2018/0015336 A1 | 1/2018 | Kohno et al. | |
| 2018/0075492 A1* | 3/2018 | Squire | G06F 3/04842 |
| 2018/0095539 A1* | 4/2018 | Zhang | G06F 3/0304 |
| 2018/0350257 A1* | 12/2018 | Picard | G06F 3/013 |
| 2019/0005090 A1* | 1/2019 | Zhang | G06F 40/30 |
| 2019/0033965 A1* | 1/2019 | Raghunath | G06F 3/04886 |
| 2019/0034038 A1* | 1/2019 | Rudchenko | G06F 3/013 |
| 2020/0097616 A1* | 3/2020 | Asur | G06F 40/295 |
| 2020/0201943 A1* | 6/2020 | Murakami | G06N 3/0454 |
| 2020/0242444 A1* | 7/2020 | Zhang | G06N 3/006 |
| 2021/0082453 A1* | 3/2021 | Guo | G10L 25/30 |

OTHER PUBLICATIONS

Anonymous; "Method and Apparatus for Context Based Machine Learning Model"; IP.com No. IPCOM000247499D; Sep. 10, 2016; 4 pages.

Anonymous; "Social Data Analysis as unobtrusive measure for validating human behavior assessment or test (Psychometric) results"; IP.com No. IPCOM000208050D; Jun. 21, 2011; 10 pages.

Collobert et al.; "Natural Language Processing (Almost) from Scratch"; Journal of Machine Learning Research 12 (2011); 45 pages.

Klerke et al.; "Improving sentence compression by learning to predict gaze"; Proceedings of NAACL-HLT 2016; San Diego, California, Jun. 12-17, 2016; 6 pages.

Kumar et al.; "Ask Me Anything: Dynamic Memory Networks for Natural Language Processing"; arXiv:1506.07285v5 [cs.CL]; Mar. 5, 2016; 10 pages.

Lance et al.; "A Model of Gaze for the Purpose of Emotional Expression in Virtual Embodied Agents"; Proc. of 7th Int. Conf. on Autonomous Agents and Multiagent Systems (AAMAS 2008); May, 12-16, 2008; 8 pages.

Liu et al.; "Representation Learning Using Multi-Task Deep Neural Networks for Semantic Classification and Information Retrieval"; Proc. NAACL. 2015; 10 pages.

Ma et al.; "Long-Term Memory Networks for Question Answering"; Proceedings of IJCAI Workshop on Semantic Machine Learning (SML 2017), Aug. 19-25, 2017, Melbourne, Australia; 8 pages.

Mell et al.; "The NIST Definition of Cloud Computing- Recommendations of the National Institute of Standards and Technology"; U.S. Department of Commerce; Sep. 2011; 7 pages.

Mishra et al.; "Cognition-Cognizant Sentiment Analysis with Multitask Subjectivity Summarization Based on Annotators' Gaze Behavior"; The Thirty-Second AAAI Conference on Arlilicial Intelligence (AAAI-18)—2018; 8 pages.

Xiong et al.; "Dynamic Memory Networks for Visual and Textual Question Answering"; Proceedings of the 33rd International Conference on Machine Learning, New York, NY, USA, 2016; 10 pages.

Yun et al.; "Studying Relationships Between Human Gaze, Description, and Computer Vision"; 2013 IEEE Conference an Computer Vision and Pattern Recognition; Jun. 23-28, 2013; 8 pages.

* cited by examiner

QUESTION ANSWERING SYSTEM INFLUENCED BY USER BEHAVIOR AND TEXT METADATA GENERATION

BACKGROUND

The present invention generally relates to Question Answering (QA) systems, and more specifically, to the use user behavior and metadata to augment QA systems.

The phrase "machine learning" broadly describes a function of an electronic system that learns from data. A machine learning system, engine, or module can include a trainable machine learning algorithm that can be trained, such as in an external cloud environment, to learn functional relationships between inputs and outputs, wherein the functional relationships are currently unknown.

The phrase "text data" broadly describes a data structure of an electronic system that includes one or more text sequences in which each text sequence holds a grouping of one or more words. Examples of a text sequence include a sentence, paragraph, document, and the like. Examples of text data include a plurality of sentences, plurality of paragraphs, plurality of documents, and the like. The text data may include content that originates from a non-text source. For example, the text data may originate from transcribed audio, video, or other suitable non-text sources.

A dialog system/agent or a conversational system/agent (CA) is a computer system intended to converse with a human in a structured manner. Dialog systems have employed text, speech, graphics, haptics, gestures, and other modes for communication on both the input and output channel. Task-oriented dialog systems such as QA systems generally provide a computer-based interface for explaining information in a repository (e.g., database) to a user and/or other system via a "dialog" that is conducted between the system and the user or between the system and another system. Some example dialog systems include chat systems, spoken dialog systems, chat agents, digital personal assistants, and automated online assistants.

SUMMARY

Embodiments of the present invention provide a computer-implemented method for handling dialogs based on user behavior data. A non-limiting example of the computer-implemented method includes receiving, by a system having one or more processors, an input paragraph having one or more factual sentences, in which each of the one or more factual sentences includes one or more words. The method includes receiving, by the system, an input question having one or more words. The method includes performing, by the system, word-level gaze prediction on the input paragraph to identify one or more predicted gaze attributes for the input paragraph. The method includes extracting, by the system, an answer to the input question, in which the answer is extracted based, at least in part, on the input paragraph, the input question, and the one or more predicted gaze attributes of the input paragraph. The method includes, transmitting, by the system, the extracted answer.

Embodiments of the present invention provide a system for handling dialogs based on user behavior data. A non-limiting example of the system includes one or more processors configured to perform a method. A non-limiting example of the method includes receiving, by the system, an input paragraph having one or more factual sentences, in which each of the one or more factual sentences includes one or more words. The method includes receiving, by the system, an input question having one or more words. The method includes performing, by the system, word-level gaze prediction on the input paragraph to identify one or more predicted gaze attributes for the input paragraph. The method includes extracting, by the system, an answer to the input question, in which the answer is extracted based, at least in part, on the input paragraph, the input question, and the one or more predicted gaze attributes of the input paragraph. The method includes, transmitting, by the system, the extracted answer.

Embodiments of the invention provide a computer program product for handling dialogs based on user behavior data, the computer program product comprising a computer readable storage medium having program instructions embodied therewith. The program instructions are executable by a system comprising one or more processors to cause the system to perform a method. A non-limiting example of the method includes receiving, by the system, an input paragraph having one or more factual sentences, in which each of the one or more factual sentences includes one or more words. The method includes receiving, by the system, an input question having one or more words. The method includes performing, by the system, word-level gaze prediction on the input paragraph to identify one or more predicted gaze attributes for the input paragraph. The method includes extracting, by the system, an answer to the input question, in which the answer is extracted based, at least in part, on the input paragraph, the input question, and the one or more predicted gaze attributes of the input paragraph. The method includes, transmitting, by the system, the extracted answer.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
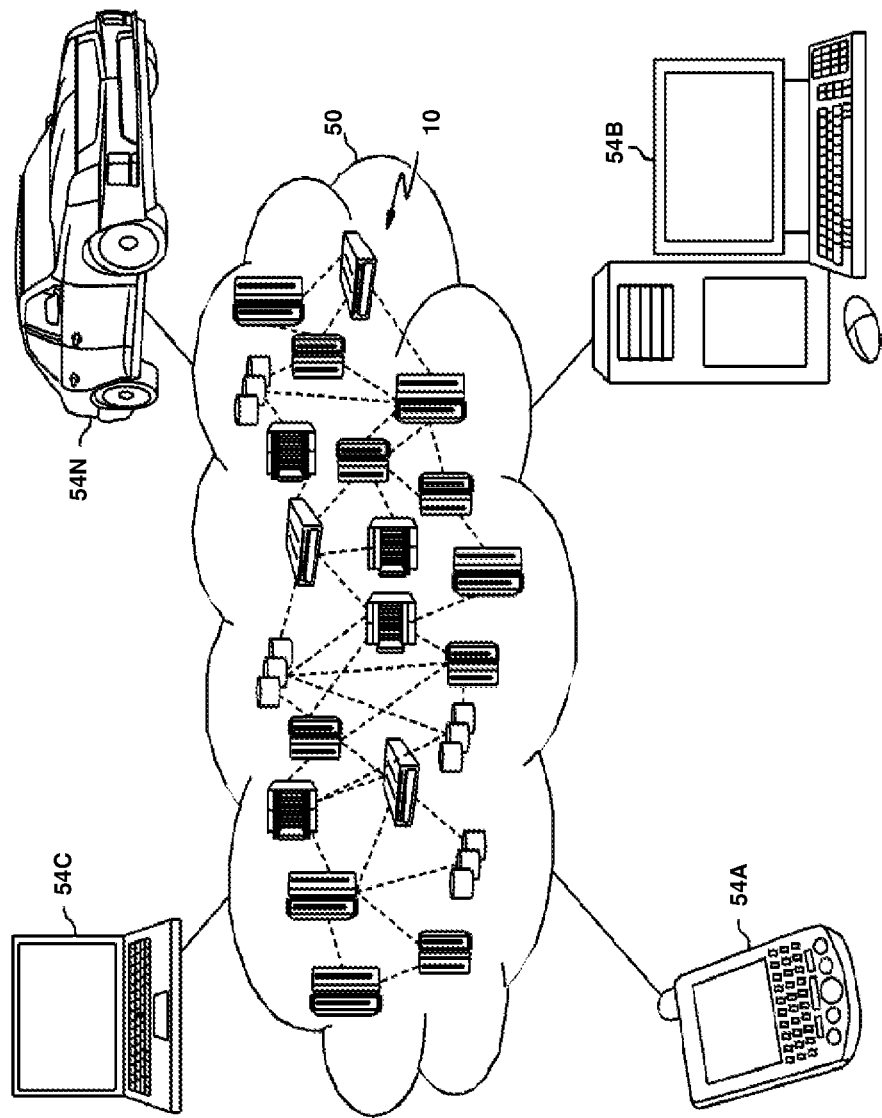
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted, or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two-digit or three-digit reference numbers. With minor exceptions (e.g., FIGS. 1-2), the leftmost digit of each reference number corresponds to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems; storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
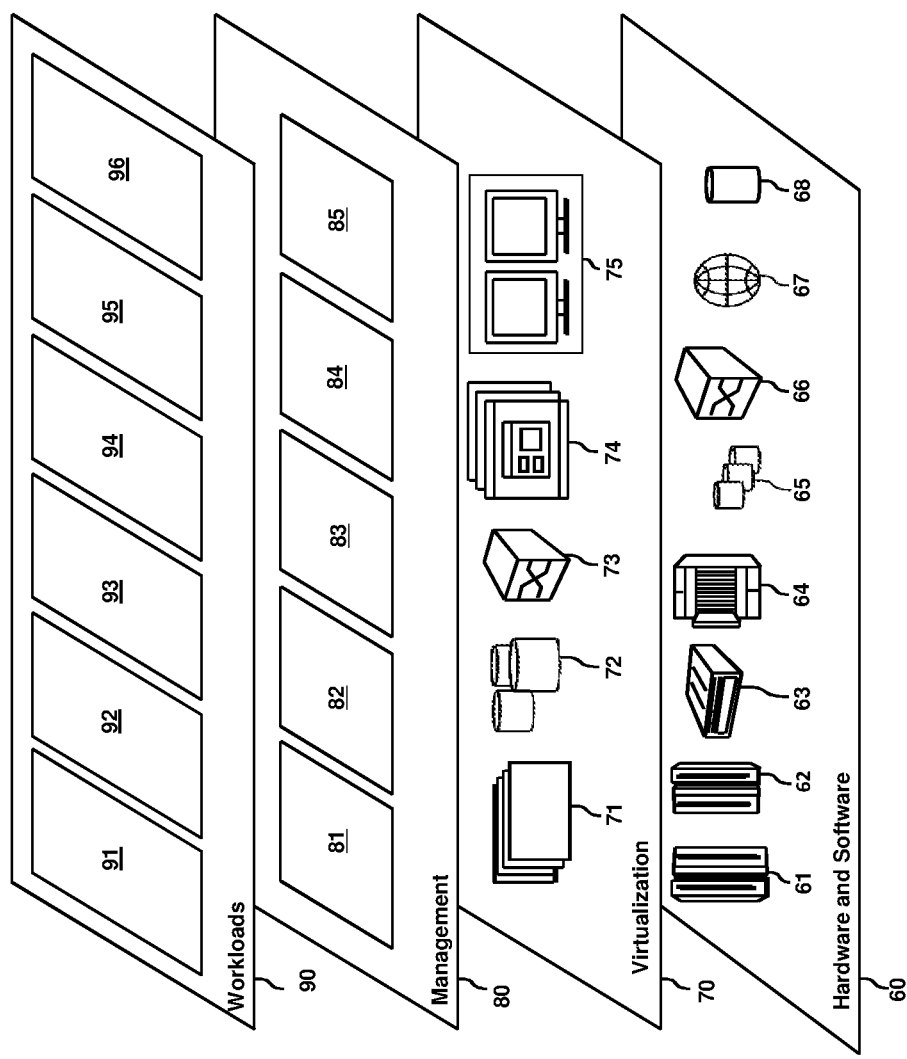
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dialog management processing 96.

Turning now to an overview of technologies that are more specifically relevant to aspects of the invention, traditional QA systems, such as task-oriented dialog systems, are heuristically driven. Some systems employ memory networks with recurrent controllers to conduct dialogs between a system and a user or between a system and another system. Example dialog systems include chat systems, spoken dialog systems, chat agents, digital personal assistants, and automated online assistants. The training process for such neural network systems rely on the training being performed on a large amount of data such as sequences of text data (e.g., paragraphs, sentences, words, etc.). However, the training process of such neural systems do not take into consideration what and when to focus on particular components of paragraphs that are to be comprehended for answering questions. For example, some training processes for memory networks rely on propagating a loss as a gradient from a single point of propagation (e.g., the last layer of the network that produces the answer). This type of single point propagation process provides insufficient learning signals for QA systems. As such, the accuracy of the systems are impeded in scenarios where text of a desired answer does not overlap with words and/or phrases of an input factual paragraph (e.g., dissimilar words/phrases).

Consider an example scenario where an input factual paragraph and a set of input questions (e.g., sentences) are received regarding the input factual paragraph. Table 1 below illustrates an example input factual paragraph having sentences (a)-(k), and Table 2 illustrates an example set of questions that are posed to the input factual paragraph.

TABLE 1

Sample Factoid Input (a) ICN Corp. had 5% increase in revenue in Q3 which amounts to USD 2.3m.
(b) Though it was expected that ICN Corp. could easily be the best performer, it still fell short of an amount of half a million from its competitor Megasoft.
...
(k) MCL Pvt. Ltd had a steady growth in Q3.

TABLE 2

Sample Question Input

Question 1: How much was the increment of revenue for ICN Corp. in Q3?
Question 2: Which corporation became the best performer in Q3?

Some prior QA systems are be able to accurately identify the answer to Question 1 above as being a "5% increase", however those systems would incorrectly identify "ICN Corp." as being the answer to Question 2. This is due to the fact that in the absence of external cues, existing systems tend to overly focus on phrases and/or words of an input factual paragraph that are located near phrases and/or words that overlap with words found in an input question (e.g., similarity between a word in the input question to a word in the input paragraph). In contrast, a human who reads the input factual paragraph in a view of Question 2 is likely to fixate their gaze on relevant portions such as "fell short" and "Megasoft," and thus concluding that the correct answer to Question 2 is that the answer cannot be ascertained without more factual information. Similar, phrases like "easily be the best," which have been overly focused on by existing QA systems, would instead be skipped or attract less duration gaze fixations when read by a human in the context of a key phrase of the input question (e.g., "best performer"), which attracts high-duration gaze fixations by the human reader.

Turning now to an overview of aspects of the invention, one or more embodiments of the invention address the above-described shortcomings of the prior art by providing a QA computer system configured to read-between-the-lines of paragraphs, in a manner similar to how humans do, such that the system is able to better focus on necessary components of text data and produce more accurate answers to questions. In embodiments of the invention, this can be achieved by ingraining into the system the ability to predict how humans read factual paragraphs and question sentences such as by training a machine learning model to predict eye-gaze behavior of a human reader.

Accordingly, one or more embodiments of the present invention, incorporates the use of human eye-gaze data (i.e., actual real-time eye-gaze data, or predicted eye-gaze data) to improve the ability to represent an input factual paragraph and input question to identify a suitable answer to the input question.

While eye-gaze patterns obtained from human readers in real-time may serve as a salient source of information, in practice real-time human eye-gaze data is often unavailable at certain times. Hence, relying on real-time actual gaze data alone may cause a QA system to be non-scalable. Accordingly, one or more embodiments of the present invention provide a QA system that is able to provide answers to questions by comprehending a given factual paragraph and input question based on predicting eye-movement patterns of a human reader.

One or more embodiments of the invention further address the above-described shortcomings of the prior art by providing a system and associated methods that augment a memory network having a multitask-bidirectional LSTM neural network to predict eye-gaze activities of a human reader to improve a QA system's ability to comprehend an input factual paragraph and answer an input question.

A system in accordance with aspects of the invention spans over multiple multimodal tasks, in which the multiple task modalities includes computational and human cognitive tasks. In some embodiments of the present invention, the computation tasks include, for example, a comprehension and question answering task that is performed on a given piece of text. In some embodiments of the present invention, the human cognitive task includes human eye-gaze prediction. The system can be implemented on a computation platform without a particular need to share hardware resources (e.g., additional CPU/memory etc.) or time (e.g., round robin CPU/memory allocation), in which each of multimodal tasks are interdependent and provide feedback into another task.

Figure 3:
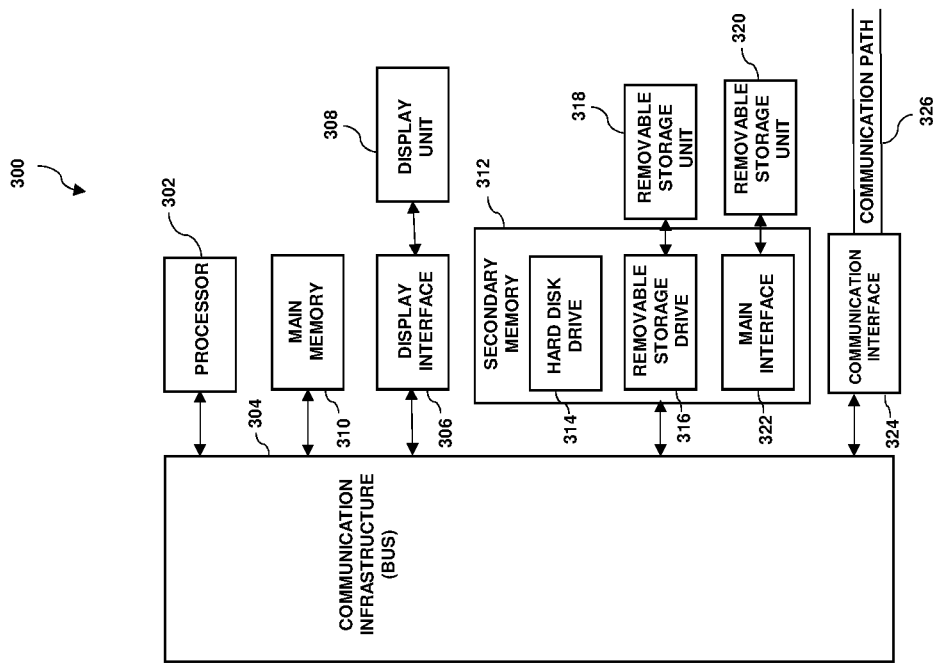
FIG. 3 depicts an exemplary computer system capable of implementing one or more embodiments of the present invention.

Turning now to a more detailed description of aspects of the present invention, FIG. 3 illustrates a high-level block diagram showing an example of a computer-based system 300 that is useful for implementing one or more embodiments of the invention. Although one exemplary computer system 300 is shown, computer system 300 includes a communication path 326, which connects computer system 300 to additional systems and may include one or more wide area networks (WANs) and/or local area networks (LANs) such as the internet, intranet(s), and/or wireless communication network(s). Computer system 300 and additional systems are in communication via communication path 326, (e.g., to communicate data between them).

Computer system 300 includes one or more processors, such as processor 302. Processor 302 is connected to a communication infrastructure 304 (e.g., a communications bus, cross-over bar, or network). Computer system 300 can include a display interface 306 that forwards graphics, text, and other data from communication infrastructure 304 (or from a frame buffer not shown) for display on a display unit 308. Computer system 300 also includes a main memory 310, preferably random access memory (RAM), and may also include a secondary memory 312. Secondary memory 312 may include, for example, a hard disk drive 314 and/or a removable storage drive 316, representing, for example, a floppy disk drive, a magnetic tape drive, or an optical disk drive. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc., which is read by and written to by a removable storage drive 316. As will be appreciated, removable storage unit 318 includes a computer readable medium having stored therein computer software and/or data.

In some alternative embodiments of the invention, secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM or PROM) and associated socket, and other removable storage units 320 and interfaces 322 which allow software and data to be transferred from the removable storage unit 320 to computer system 300.

Computer system 300 may also include a communications interface 324. Communications interface 324 allows software and data to be transferred between the computer system and external devices. Examples of communications interface 324 may include a modem, a network interface (such as an Ethernet card), a communications port, or a PCM-CIA slot and card, etc. Software and data transferred via communications interface 324 are in the form of signals which may be, for example, electronic, electromagnetic, optical, or other signals capable of being received by communications interface 324. These signals are provided to communications interface 324 via communication path (i.e., channel) 326. Communication path 326 carries signals and may be implemented using a wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 310 and secondary memory 312, removable storage drive 316, and a hard disk installed in hard disk drive 314. Computer programs (also called computer control logic) are stored in main memory 310, and/or secondary memory 312. Computer programs may also be received via communications interface 324. Such computer programs, when run, enable the computer system to perform the features of the present disclosure as discussed herein. In particular, the computer programs, when run, enable processor 302 to perform the features of the computer system. Accordingly, such computer programs represent controllers of the computer system.

Figure 4:
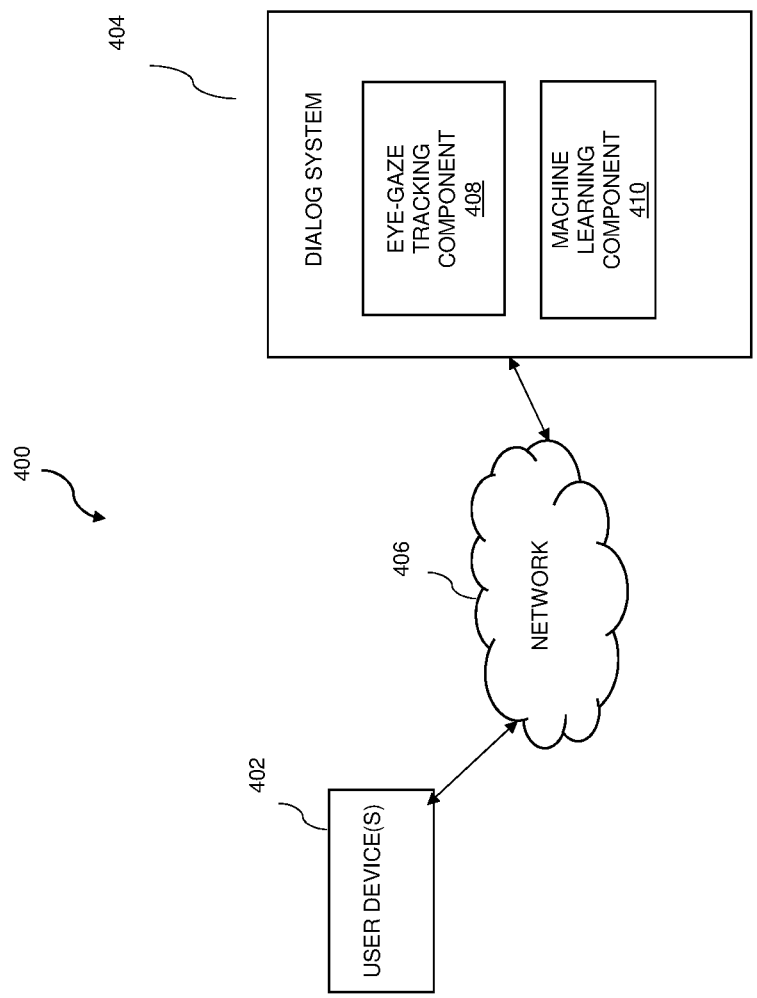
FIG. 4 depicts an example distributed environment in accordance with one or more embodiments of the present invention.

Referring now to FIG. 4, an example distributed environment 400 is presented for dialog processing via a question and answer system. Distributed environment 400 includes one or more user devices 402 and a dialog system 404, which are interconnected via network 406. FIG. 4 provides an illustration of only one example system and does not imply any limitation with regard to other systems in which different embodiments of the present invention may be implemented. Various suitable modifications to the depicted environment may be made, by those skilled in the art, without departing from the scope of the invention as recited by the claims.

Dialog system 404 includes an eye gaze tracking component 408, and a machine learning component 410. In some embodiments of the present invention, eye gaze tracking component 408, and/or machine learning component 410 are interconnected via a communication infrastructure 304 and/or communication path 326. Dialog system 404 may have internal and external hardware components, such as those depicted and described above with respect to FIG. 3.

Dialog system 404 is a machine learning system that can be utilized to solve a variety of technical issues (e.g., learning previously unknown functional relationships) in connection with technologies such as, but not limited to, machine learning technologies, video processing technologies, virtual reality technologies, data analytics technologies, data classification technologies, data clustering technologies, recommendation system technologies, signal processing technologies, text analysis technologies, and/or other digital technologies. Dialog system 404 employs hardware and/or software to solve problems that are highly technical in nature, that are not abstract and that cannot be performed as a set of mental acts by a human.

In certain embodiments of the invention, some or all of the processes performed by dialog system 404 are performed by one or more specialized computers for carrying out defined tasks related to machine learning. In some embodiments of the invention, dialog system 404 and/or components of the system are employed to solve new problems that arise through advancements in technologies mentioned above.

Machine learning is often employed by numerous technologies to determine inferences and/or relationships among digital data. For example, machine learning technologies, signal processing technologies, image processing technologies, data analysis technologies, and/or other technologies employ machine learning models to analyze digital data, process digital data, determine inferences from digital data, and/or determine relationships among digital data. Machine learning functionality can be implemented using an artificial neural network (ANN) having the capability to be trained to perform a currently unknown function. In machine learning and cognitive science, ANNs are a family of statistical learning models inspired by the biological neural networks of animals, and in particular the brain. ANNs can be used to estimate or approximate systems and functions that depend on a large number of inputs.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was read.

In some embodiments of the present invention, dialog system 404 is a standalone computing device, a management server, a web server, a mobile computing device, or other suitable electronic device and/or computing system capable of receiving, sending, and processing data. In some embodiments of the present invention, dialog system 404 is a server computing system utilizing multiple computers, such as in cloud computing environment 50. In some embodiments of the present invention, dialog system 404 is a laptop computer, a tablet computer, a netbook computer, a personal computer (PC), a desktop computer, a personal digital assistant (PDA), a smart phone, or other suitable programmable electronic device capable of communicating with user device 402 and other computing devices (not shown) within distributed environment 400 via network 406. In some embodiments of the present invention, dialog system 404 is a computing system utilizing clustered computers and components (e.g., database server computers, application server computers, etc.) that act as a single pool of seamless resources that are accessible within distributed environment 400. Dialog system 404 may have internal and external hardware components, such as those depicted and described above with respect to FIG. 3.

Network 406 can be, for example, a telecommunications network, a local area network (LAN), a wide area network (WAN), such as the Internet, or a combination of the three, and can include wired, wireless, or fiber optic connections. Network 406 can include one or more wired and/or wireless networks that are capable of receiving and transmitting data, voice, and/or video signals, including multimedia signals that include voice, data, and video information. In general, network 406 can be any suitable combination of connections and protocols that can support communications between user device 402 and dialog system 404, and/or other computing devices (not shown) within a distributed environment 400. In some embodiments of the present invention, distributed environment 400 is implemented as part of a cloud computing environment such as cloud computing environment 50 (FIG. 1).

User device 402 is configured to allow users to send and/or receive information to user device 402 from dialog system 404, which in turn allows users to access eye-gaze tracking component 408, and machine learning component 410. In some embodiments of the present invention, user device 402 is configured to gather user input data, biometric data, audible data, and/or visual data. For example, in some embodiments of the present invention, user device 402 includes one or more sensors for obtaining sensor data of the user, such as tracking an eye-gaze of the user, detecting head movement of the user, and/or detecting a facial expression of the user. In some embodiments of the present invention, user device 402 is configured to capture and/or present audio, images, and/or video of the user and/or to the user (e.g., via a microphone and/or camera of user device 402).

In some embodiments of the present invention, user device 402 is a laptop computer, a tablet computer, a netbook computer, a personal computer (PC), a desktop computer, a personal digital assistant (PDA), a smart phone, an internet-of-things (IoT) enabled device, a VR/Augmented Reality (AR) display device, and/or other suitable programmable electronic devices capable of communicating with various components and devices within distributed environment 400. In some embodiments of the present invention, user device 402 comprises two or more separate devices. In some embodiments of the present invention, user device 402 is a programmable electronic mobile device or a combination of programmable electronic mobile devices capable of executing machine readable program instructions and communicating with other computing devices (not shown) within distributed environment 400. In some embodiments of the present invention, user device 402 may include internal and external hardware components, such as those depicted and described above with respect to FIG. 3.

In general, dialog system 404 is a cognitive-based tool that is configured to receive an input paragraph the input paragraph having one or more factual sentences, in which each of the one or more factual sentences includes one or more words. Dialog system 404 is configured to receive an input question having one or more words. In some embodiments of the present invention, the input paragraph and/or the input question are received from user device 402. In some embodiments of the present invention, the input paragraph and or the input question are stored within dialog system 404 and later retrieved as inputs from internal storage. In some embodiments of the present invention, dialog system 404 is configured to perform word-level eye-gaze prediction on the input paragraph to identify one or more predicted eye-gaze attributes for the input paragraph. In some embodiments of the present invention, dialog system 404 is configured to extract an answer to the input question based, at least in part, on the input paragraph, the input question sentence, and the one or more predicted eye-gaze attributes of the input paragraph. In some embodiments of the present invention, dialog system 404 is configured to perform word-level eye-gaze prediction on both the input paragraph and the input question, in which the extracting of the answer is based, at least in part, on the input paragraph, the input question, the one or more predicated eye-gaze attributes of the input paragraph, and the one or more predicated eye-gaze attributes of the input question. In some embodiments of the present invention, dialog system 404 is configured to transmit the extracted answer to a user (e.g., to user device 402).

Figure 5:
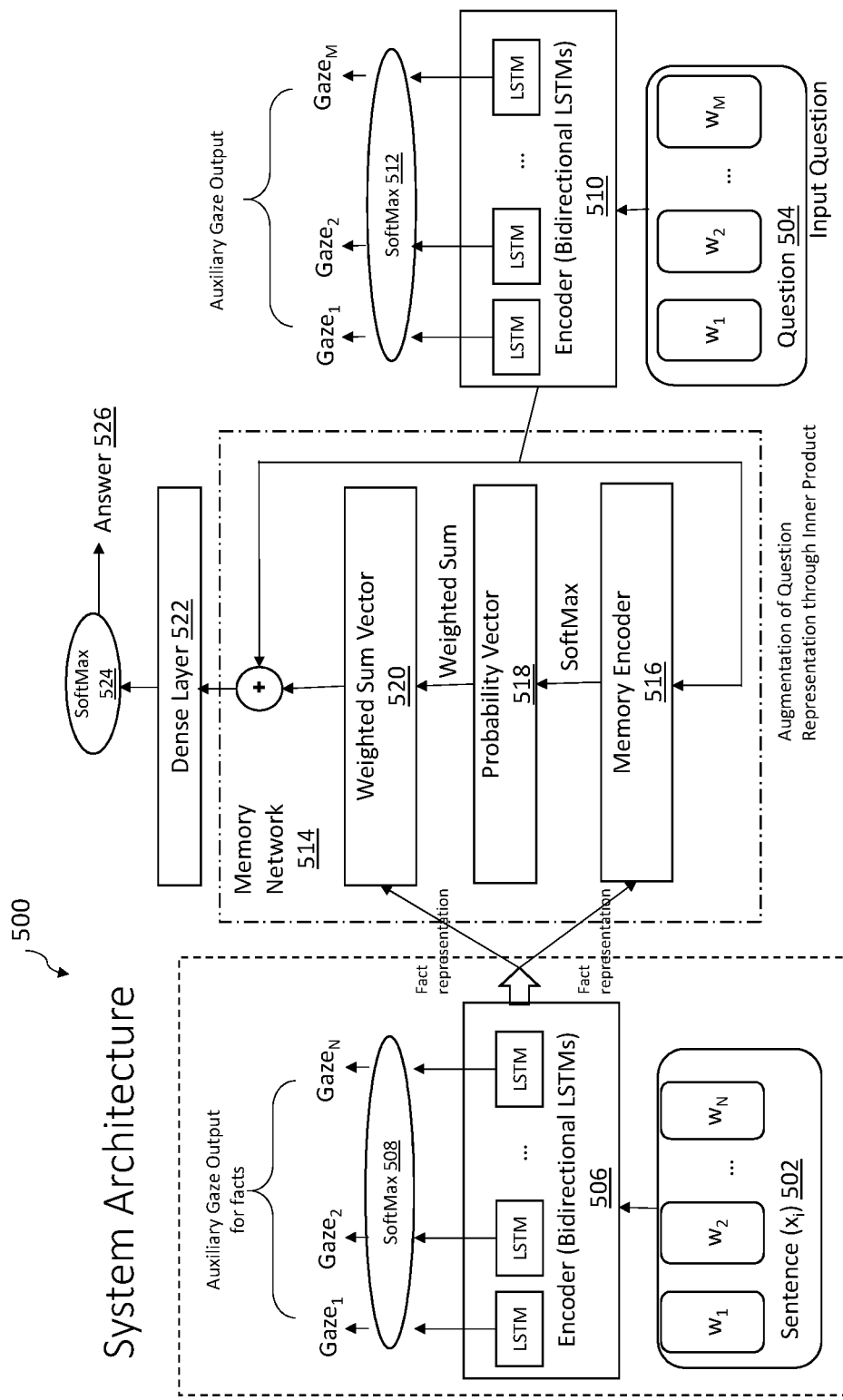
FIG. 5 depicts a system architecture of an example dialog system in accordance with one or more embodiments of the present invention.

FIG. 5 depicts a system architecture of an example dialog system 500 (e.g., dialog system 404 of FIG. 4) in accordance with one or more embodiments of the present invention. Dialog system 500 is configured to receive one or more input paragraphs of text, in which each paragraph includes one or more factual sentences 502 (i.e., K number of sentences), in which each sentence (i.e., sentence ($x_i$)) includes a sequence of one or more words (i.e., N number of words). Dialog system 500 is configured to further receive an input question 504 comprising a sentence having a sequence of one or more words (i.e., M number of words).

A first set of bidirectional long-short term memory (LSTM) encoders 506 are stacked to capture a context of the one or more factual sentences 502 of the input paragraph. The context is captured based, at least in part, on performing word-level gaze prediction on the input paragraph via the first set of bidirectional LSTM encoders 506, in which the word-level gaze prediction on the input paragraph includes passing outputs of the first set of bidirectional LSTM encoders 506 through a SoftMax layer 508 that predicts one or more gaze attributes for each word of the input paragraph. The one or more sentences of the input paragraph are encoded through the first set of bidirectional LSTM encoders 506 based on the one or more predicted gaze attributes of the input paragraph to yield a set of vector representations. For example, if the input paragraph includes K number of sentences, then K-factual sentences are encoded through the first set of bidirectional LSTM encoders 506 to yield K-vector representations.

Similarly, a second set of bidirectional LSTM encoders 510 are stacked to capture a context of input question 504. The context is captured based, at least in part, on performing word-level gaze prediction on input question 504 via the first set of bidirectional LSTM encoders 506, in which the word-level gaze prediction on input question 504 includes passing outputs of the second set of bidirectional LSTM encoders 510 through a SoftMax layer 512 that predicts one or more gaze attributes for each word of input question 504. Input question 504 is encoded through the second set of bidirectional LSTM encoders 510 based on the one or more predicted gaze attributes of the input question to yield a vector representation of the input question.

In some embodiments of the present invention, the one or more gaze attributes that are predicted for the input paragraph and the input question 504 includes a fixation duration associated with each word, fixation order, or other suitable gaze attributes. The fixation duration may indicate the amount of time that a user is predicted to look at a particular word and/or phrase (i.e., combination of words). The fixation order may indicate the order in which the user is predicted to look at all or a subset of words and/or phrases. In some embodiments of the present invention, each word of the input paragraph and/or input question is associated with a word ID that uniquely identifies the word in the paragraph or sentence. In some embodiments of the present invention, the word ID is the word itself. In some embodiments of the present invention, the word ID is a sequential value that is associated with a position of a given word or phrase in a sentence. For example, given the example sentence "A dog ran through the yard," the word ID of the word "ran" may be associated with the value "3" as the word "ran" is the third sequential word of the sentence.

In some embodiments of the present invention, a predicted gaze attribute is associated with each word ID of an input paragraph and/or sentence, such as for example, a predicted length of time that the user would focus their gaze on a respective word. In some embodiments of the present invention, the gaze attribute associated with a given word ID is associated with a predicted fixation order such as, for example, an array that includes a sequence of word IDs, in which the sequence is ordered according to a predicted eye-gaze of the user. For example, given the example sentence above, an example set of eye-gaze attributes may be an array such as, for example, ([yard], [dog], [ran], [through the]) in which the array is indexed in accordance with the predicted fixation order. In some embodiments of the present invention, the array may further include a fixation duration that is associated with a word ID such as, for example, ([yard: 0.5], [dog: 0.5], [ran: 0.2], [through the: 0.2]) in which the values represent an amount of time (e.g., seconds, minutes, etc.) or a ratio between the amount of time of a given word and a total fixation duration of the sentence and/or paragraph. In some embodiments of the present invention, the predicted eye-gaze attributes are provided as auxiliary outputs to a user (e.g., via user device 402 of FIG. 4).

Memory encoder 516 of memory network 514 is configured to superpose the encoded question vector representation with the K-vector representations of the input paragraph via, for example, a dot product operation followed by a SoftMax operation, which yields a probability vector 418 having K-probability values. The K-probability values act as weights indicative of how much each fact vector contributes towards identifying an answer 526 for the input question 504. Each K-fact-vector is multiplied with a corresponding probability (e.g., weight) value from probability vector 518. The products of the multiplication are added together to yield a weighted sum vector 520. Weighted sum vector 520 captures the portions of each fact vector that are relevant to outputting the answer 526 to the input question 504.

In some embodiments of the present invention, memory network 514 is configured to concatenate the weighted sum vector 520 with the encoded question vector before passing the resulting vector through a dense layer 522 and SoftMax layers 524 to output an answer 526 to the input question 504. Adding the encoded question vector with the weighted sum output helps the system remove redundant words and/or paraphrases that are present in both the question and fact and eventually identify words and/or phrases of an answer that are not present in the question.

In some embodiments of the present invention, SoftMax layer 508, SoftMax layer 512, first set of bidirectional LSTM encoders 506, and/or second set of bidirectional LSTM encoders 510 are trained based, at least in part on, actual eye-gaze data that is received from a user (e.g., via user device 402 of FIG. 4) during a training process. In some embodiments of the present invention the training includes, for each training epoch, selecting a multimodal task randomly and selecting an appropriate batch of training text data (e.g., training set of question sentences, training set of factual paragraphs, etc.). Task specific loss functions are defined using one or more machine learning algorithms (e.g., via eye-gaze tracking component 408, machine learning component 410, etc.). In some embodiments of the present invention, the task specific loss function is a cross entropy loss function. In some embodiments of the present invention, the training includes the use of natural language processing (NLP) for parsing, tokenization, embedded learning, and other suitable processes (e.g., via machine learning component 410). A non-limiting example training process includes, presenting a user with a first question and a first paragraph (e.g., via user device 402), measuring an eye-gaze duration of the user for each word in the first paragraph, receiving an indication of a first answer, in which the first answer corresponds to the first question and in which the first answer is contained in the first paragraph, and then training a QA machine learning model based, at least in part, on the eye-gaze measured gaze duration, the first question, and the first answer. Once the QA machine learning model is trained, the QA machine learning model can be used to extract a second answer from a second paragraph in response to a second question, in which the second answer is extracted based on predicted eye-gaze behavior (e.g., predicted word-level eye-gaze durations). The second answer is transmitted to the user via a user device associated with the user (e.g., user device 402 of FIG. 4).

Figure 6:
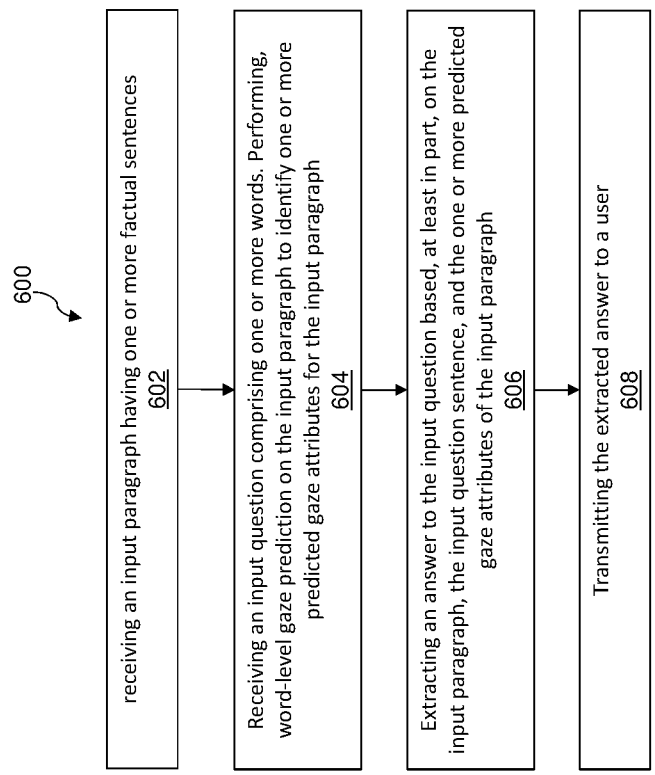
FIG. 6 depicts a flow diagram illustrating a methodology in accordance with one or more embodiments of the present invention.

Additional details of the operation of dialog system 500 will now be described with reference to FIG. 6, wherein FIG. 6 depicts a flow diagram illustrating a methodology 600 executed by the dialog system 500 according to one or more embodiments of the present invention. At block 602, an input paragraph having one or more factual sentences is received (e.g., received at dialog system 404 from user device 402 of FIG. 4), in which each of the one or more factual sentences includes one or more words. At block 604, an input question having one or more words is received (e.g., received at dialog system 404 from user device 402 of FIG. 4). At block 606, word-level gaze prediction is performed on the input paragraph to identify one or more predicted gaze attributes for the input paragraph (e.g., via dialog system 404). At block 606, the extract answer is transmitted to a user (e.g., transmitted from dialog system 404 to user device 402).

In some embodiments of the present invention, the word-level gaze prediction that is performed on the input paragraph includes passing outputs of each timestamp of a first set of bidirectional LSTM encoders through a first SoftMax layer that predicts the one or more gaze attributes for each word of the input paragraph.

In some embodiments of the present invention, methodology 600 further includes performing, via a second set of bidirectional LSTM encoders, word-level gaze prediction on the input question to identify one or more predicted gaze attributes for the input question. In some embodiments of the present invention, the performing of the word-level gaze prediction on the input question includes passing outputs of each timestamp of the second set of bidirectional LSTM encoders through a second SoftMax layer that predicts one or more gaze attributes for each word of the input question. The extracting of the answer to the input question is further based on the one or more predicted gaze attributes of the input question.

In some embodiments of the present invention, the extracting of the answer includes passing the outputs of the first and second set of bidirectional LSTM encoders to a memory network. In some embodiments of the present invention, the one or more sentences of the input paragraph are encoded through the first set of bidirectional LSTM encoders based on the one or more predicted gaze attributes of the input paragraph to yield a set of vector representations. In some embodiments of the present invention, the set of vector representations includes a vector representation for each of the one or more sentences of the input paragraph, in which the input question is encoded through the second set of bidirectional LSTM encoders based on the one or more predicted gaze attributes of the input question to yield a vector representation of the input question.

In some embodiments of the present invention, the memory network is configured to generate a probability vector via a SoftMax operation based on superposing the encoded vector representation of the input question with the encoded vector representations of the input paragraph. In some embodiments of the present invention, the memory network is further configured to generate a weighted sum vector by multiplying each of the encoded vector representations of the input paragraph with a corresponding probability value of the probability vector and summing products of the multiplication, in which the extraction of the answer is based, at least in part, on the weighted sum vector. In some embodiments of the present invention, the memory network is further configured to concatenate the weighted sum vector with the encoded question vector and pass the concatenated weighted sum vector through a dense layer and a third SoftMax layer, in which the extraction of the answer is based, at least in part, on the concatenated weighted sum vector 520.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for handling dialogs based on user behavior data, the computer-implemented method comprising:
   receiving, by a system comprising one or more processors, an input paragraph comprising one or more factual sentences, wherein each of the one or more factual sentences includes one or more words;
   receiving, by the system, an input question comprising one or more words;
   performing, by the system, a word-level gaze prediction on the input paragraph to identify one or more predicted eye-gaze attributes for the input paragraph, wherein the word-level gaze prediction comprises a prediction of a human gaze that would be performed by a human reading the input paragraph;
   extracting, by the system, an answer to the input question based, at least in part, on the input paragraph, the input question, and the one or more predicted eye-gaze attributes of the input paragraph;
   transmitting, by the system, the extracted answer;
   wherein performing the word-level gaze prediction on the input paragraph includes passing outputs of each timestamp of a first set of bidirectional long short-term memory (LSTM) encoders through a first SoftMax layer that predicts the one or more eye-gaze attributes for each word of the input paragraph; and
   performing, by the system, via a second set of bidirectional LSTM encoders, word-level gaze prediction on the input question to identify one or more predicted gaze attributes for the input question;
   wherein the performing of the word-level gaze prediction on the input question includes passing outputs of each timestamp of the second set of bidirectional LSTM encoders through a second SoftMax layer that predicts one or more gaze attributes for each word of the input question; and
   wherein the extracting of the answer to the input question is further based on the one or more predicted gaze attributes of the input question.

2. The computer-implemented method of claim 1, wherein the extracting of the answer includes passing the outputs of the first and second set of bidirectional LSTM encoders to a memory network.

3. The computer-implemented method of claim 2, wherein the one or more sentences of the input paragraph are encoded through the first set of bidirectional LSTM encoders based on the one or more predicted eye-gaze attributes of the input paragraph to yield a set of vector representations, wherein the set of vector representations includes a vector representation for each of the one or more sentences of the input paragraph, wherein the input question is encoded through the second set of bidirectional LSTM encoders based on the one or more predicted eye-gaze attributes of the input question to yield a vector representation of the input question.

4. The computer-implemented method of claim 3, wherein the memory network is configured to:
   generate a probability vector via a SoftMax operation based on superposing the encoded vector representation of the input question with the encoded vector representations of the input paragraph; and
   generate a weighted sum vector by multiplying each of the encoded vector representations of the input paragraph with a corresponding probability value of the probability vector and summing products of the multiplication, wherein the extraction of the answer is based, at least in part, on the weighted sum vector.

5. The computer-implemented method of claim 4, wherein the memory network is further configured to concatenate the weighted sum vector with the encoded question vector and pass the concatenated weighted sum vector through a dense layer and a third SoftMax layer, wherein the extraction of the answer is based, at least in part, on the concatenated weighted sum vector.

6. A computer program product for handling dialogs based on human eye-gaze behavior data, the computer program product comprising a computer readable storage medium having program instructions embodied therewith, the program instructions executable by a system comprising one or more processors to cause the system to perform a method comprising:

receiving, by the system, an input paragraph comprising one or more factual sentences, wherein each of the one or more factual sentences includes one or more words;

receiving, by the system, an input question comprising one or more words;

performing, by the system, word-level gaze prediction on the input paragraph to identify one or more predicted gaze attributes for the input paragraph, wherein the word-level gaze prediction comprises a prediction of a human gaze that would be performed by a human reading the input paragraph;

extracting, by the system, an answer to the input question based, at least in part, on the input paragraph, the input question, and the one or more predicted gaze attributes of the input paragraph;

transmitting, by the system, the extracted answer;

wherein performing the word-level gaze prediction on the input paragraph includes passing outputs of each timestamp of a first set of bidirectional long short-term memory (LSTM) encoders through a first SoftMax layer that predicts the one or more eye-gaze attributes for each word of the input paragraph; and performing, by the system, via a second set of bidirectional LSTM encoders, word-level gaze prediction on the input question to identify one or more predicted eye-gaze attributes for the input question, wherein the performing of the word-level gaze prediction on the input question includes passing outputs of each timestamp of the second set of bidirectional LSTM encoders through a second SoftMax layer that predicts one or more eye-gaze attributes for each word of the input question, wherein the extracting of the answer to the input question is further based on the one or more predicted eye-gaze attributes of the input question.

7. The computer program product of claim 6, wherein the extracting of the answer includes passing the outputs of the first and second set of bidirectional LSTM encoders to a memory network.

8. The computer program product of claim 7, wherein the one or more sentences of the input paragraph are encoded through the first set of bidirectional LSTM encoders based on the one or more predicted eye-gaze attributes of the input paragraph to yield a set of vector representations, wherein the set of vector representations includes a vector representation for each of the one or more sentences of the input paragraph, wherein the input question is encoded through the second set of bidirectional LSTM encoders based on the one or more predicted eye-gaze attributes of the input question to yield a vector representation of the input question.

9. The computer program product of claim 8, wherein the memory network is configured to:

generate a probability vector via a SoftMax operation based on superposing the encoded vector representation of the input question with the encoded vector representations of the input paragraph; and generate a weighted sum vector by multiplying each of the encoded vector representations of the input paragraph with a corresponding probability value of the probability vector and summing products of the multiplication, wherein the extraction of the answer is based, at least in part, on the weighted sum vector.

10. The computer program product of claim 9, wherein the memory network is further configured to concatenate the weighted sum vector with the encoded question vector and pass the concatenated weighted sum vector through a dense layer and a third SoftMax layer, wherein the extraction of the answer is based, at least in part, on the concatenated weighted sum vector.

11. A system for handling dialogs based on user behavior data, the system comprising one or more processors configured to perform a method comprising:

receiving, by the system, an input paragraph comprising one or more factual sentences, wherein each of the one or more factual sentences includes one or more words;

receiving, by the system, an input question comprising one or more words;

performing, by the system, a word-level gaze prediction on the input paragraph to identify one or more predicted gaze attributes for the input paragraph, wherein the word-level gaze prediction comprises a prediction of a human gaze that would be performed by a human reading the input paragraph;

extracting, by the system, an answer to the input question based, at least in part, on the input paragraph, the input question, and the one or more predicted eye-gaze attributes of the input paragraph; and transmitting, by the system, the extracted answer;

wherein performing the word-level gaze prediction on the input paragraph includes passing outputs of each timestamp of a first set of bidirectional long short-term memory (LSTM) encoders through a first SoftMax layer that predicts the one or more eye-gaze attributes for each word of the input paragraph; and performing, by the system, via a second set of bidirectional LSTM encoders, word-level gaze prediction on the input question to identify one or more predicted eye-gaze attributes for the input question;

wherein the performing of the word-level gaze prediction on the input question includes passing outputs of each timestamp of the second set of bidirectional LSTM encoders through a second SoftMax layer that predicts one or more eye-gaze attributes for each word of the input question; and wherein the extracting of the answer to the input question is further based on the one or more predicted eye-gaze attributes of the input question.

12. The system of claim 11, wherein the extracting of the answer includes passing the outputs of the first and second set of bidirectional LSTM encoders to a memory network.

13. The system of claim 12, wherein the one or more sentences of the input paragraph are encoded through the first set of bidirectional LSTM encoders based on the one or more predicted eye-gaze attributes of the input paragraph to yield a set of vector representations, wherein the set of vector representations includes a vector representation for each of the one or more sentences of the input paragraph, wherein the input question is encoded through the second set of bidirectional LSTM encoders based on the one or more predicted eye-gaze attributes of the input question to yield a vector representation of the input question.

14. The system of claim 13, wherein the memory network is configured to:

generate a probability vector via a SoftMax operation based on superposing the encoded vector representation of the input question with the encoded vector representations of the input paragraph;

generate a weighted sum vector by multiplying each of the encoded vector representations of the input paragraph with a corresponding probability value of the probability vector and summing products of the multiplication, wherein the extraction of the answer is based, at least in part, on the weighted sum vector;

concatenate the weighted sum vector with the encoded question vector; and pass the concatenated weighted sum vector through a dense layer and a third SoftMax layer, wherein the extraction of the answer is based, at least in part, on the concatenated weighted sum vector.

* * * * *